United States Patent [19]

Halvorsen

[11] Patent Number: 4,524,538

[45] Date of Patent: Jun. 25, 1985

[54] TROLLING BOARD

[76] Inventor: Stephen H. Halvorsen, 2935 Alabama Ave., Minneapolis, Minn. 55416

[21] Appl. No.: 482,070

[22] Filed: Apr. 5, 1983

[51] Int. Cl.³ ............................................. A01K 91/00
[52] U.S. Cl. .................................................... 43/43.13
[58] Field of Search .................... 43/43.13, 26.1, 26.2; 46/93

[56] References Cited

U.S. PATENT DOCUMENTS

| | | | |
|---|---|---|---|
| 3,747,248 | 7/1973 | Baer | 43/43.13 |
| 3,818,624 | 6/1974 | Duffy | 43/43.13 |
| 3,949,512 | 4/1976 | Stegemeyer | 43/43.13 |

Primary Examiner—Nicholas P. Godici
Assistant Examiner—M. Jordan
Attorney, Agent, or Firm—Allan O. Maki

[57] ABSTRACT

A trolling board for fishing designed to tow a bait behind and to the side of a moving boat, including a generally flat, elongated, float member having a front end generally tapered from one side to another and rearwardly, and having a weight on one side edge, which is thereby caused to be heavier than the other, a fishing line engaging device preferably of a type which will squeeze the line between a stationary member and an eccentric rotatable member having a spring which is pivoted over center when the fishing line is engaged, and a trip lever engaging the rotatable device, said lever being adapted to rotate said device and release said line from the trolling device when a fish strikes the baited end of the line.

4 Claims, 4 Drawing Figures

TROLLING BOARD

BACKGROUND OF THE INVENTION

The present invention relates to an improved trolling board for trolling for fish with a boat and motor. Such trolling boards have previously been employed, the earliest of such devices having been towed by a separate line behind the boat. The trolling board is shaped so that it will swim away from the boat to one side so that a fishing lure, rather than being towed in the wake of the boat, is towed to the side either nearer or farther from shore than the path of the boat. One example of such a device is shown in U.S. Pat. No. 3,949,512.

The present invention provides an improved trolling board which is towed by the fishing line. In the preferred embodiment, a mechanism is provided which will release the trolling board from the line when a fish is caught. The trolling board may be provided with a marking flag to improve visibility thereof for retrieval. The floating board with flat projecting therefrom can be useful to the fisherman as an indicator of the location of a school of fish when it is retrieved. Optionally, the device may be provided with a loop or ring through which the line is passed so that the trolling board remains attached to the line even after the towing mechanism has been tripped. In such case, after such tripping, the device together with the fish is towed centrally of the boat.

Further objects and advantages of the invention are the provision of a simple, inexpensive and easy to use trolling board. A further incidental advantage is to increase the number of line which can be towed behind a boat.

SUMMARY OF THE INVENTION

A trolling board adapted to be towed behind a boat comprising a flat elongated body member weighted and therefore heavier on one side having a front end which is generally tapered from one side to the other and rearwardly so as to cause said device to move toward one side when towed in water, the trolling board being provided with means adapted to engage fishing line towed behind a boat which includes a trip mechanism adapted to release the line when it is tugged on by a fish, the trip mechanism including a stationary surface and a rotatable member having an eccentric outer surface which upon rotation will engage the stationary surface so that a line placed between the stationary surface and rotatable member will be squeezed there-between, rotation to the untripped portion being in a direction such that pulling on the line by the boat urges the same to engage the line more tightly, the rotatable member having a trip lever attached integrally thereto adapted to engage the line at a point nearer the bait so that a tug on said bait will rotate the locking mechanism in a direction to disengage the line therefrom.

Further objects and advantages will be apparent from the accompanying description and drawings wherein.

DESCRIPTION OF THE PREFERRED EMBODIMENT

Figure 1:
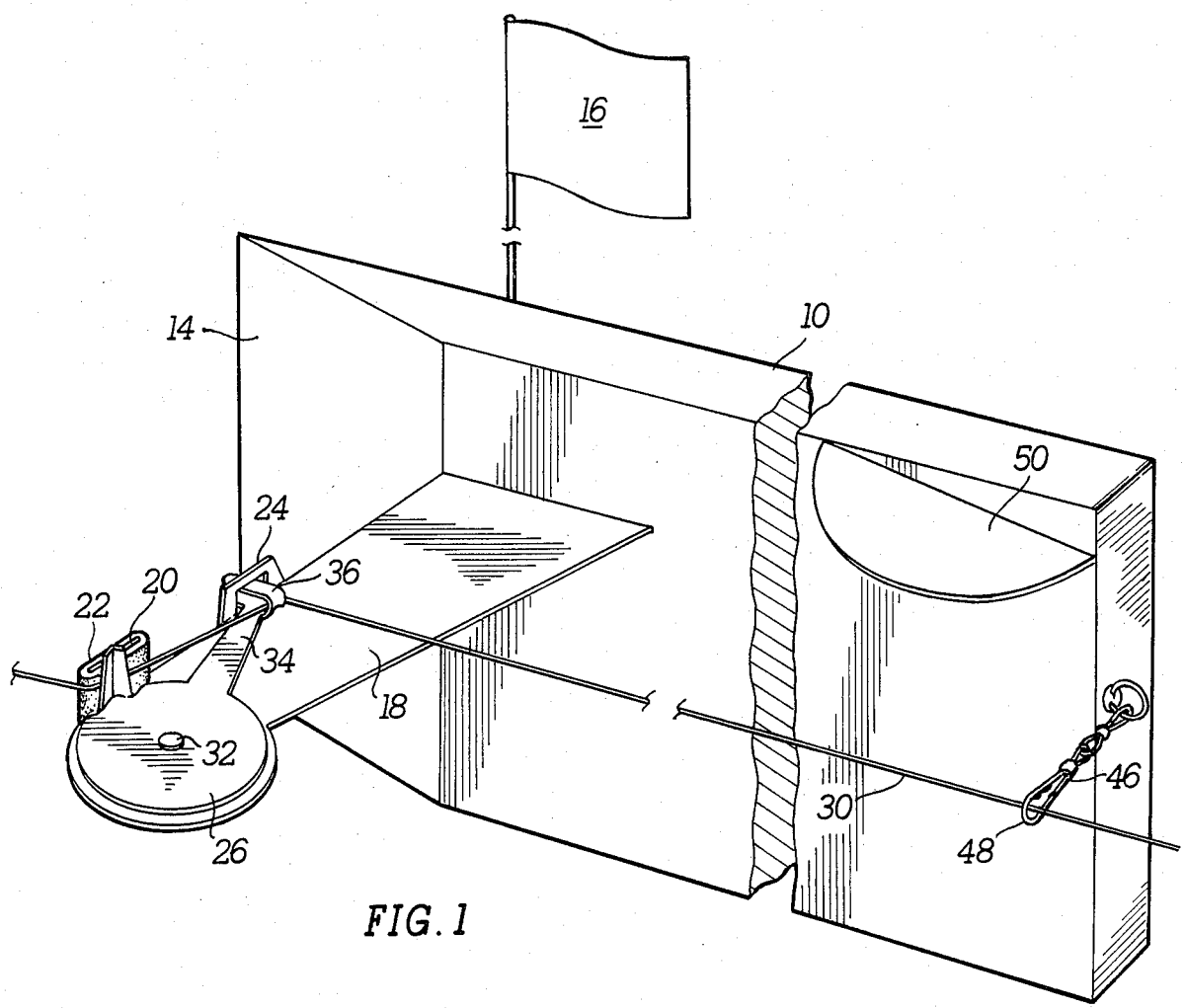
FIG. 1 is a perspective view of a trolling board of this invention.

In the drawings, numeral 10 designates the main body portion of the trolling board. It will be noted that the trolling board is adapted to travel through the water with the flag upright in FIG. 1. Body 10 may be constructed of wood, hollow metal or plastic, foam plastic or other suitable materials which provide buoyancy and suitable strength. AS weight 12 is provided on the bottom side of the device to maintain the same in a vertical position in the water.

The front portion 14 of body 10 is angeled as shown in each of the figures of drawings so as to slope rearwardly and inwardly from one side to the other. The angled configuration of front portion 14 serves to cause the device to be towed away from the side of a boat behind which it is towed. It will be apparent to those skilled in the art that various other configurations may be used to cause the device to be propelled away from the boat. The flag 15 may be affixed to the device to aid in the location thereof if the same is separated from the boat.

Figure 4:
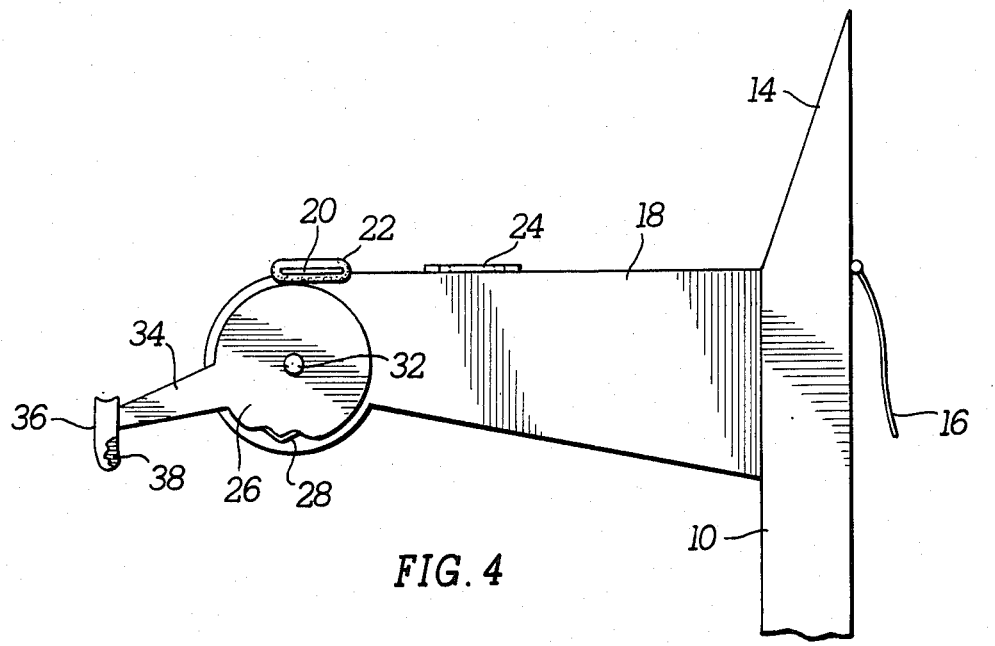
FIG. 4 is a fragmented top view of the device in the tripped position.
Figure 2:
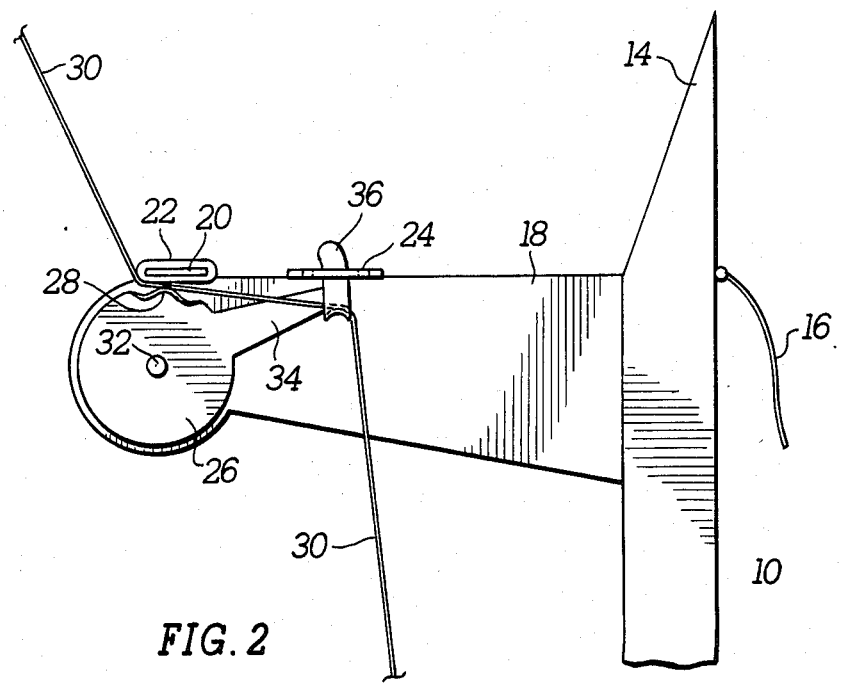
FIG. 2 is a fragmented top view of the device with the trolling line in the trolling or untripped position.
Figure 3:
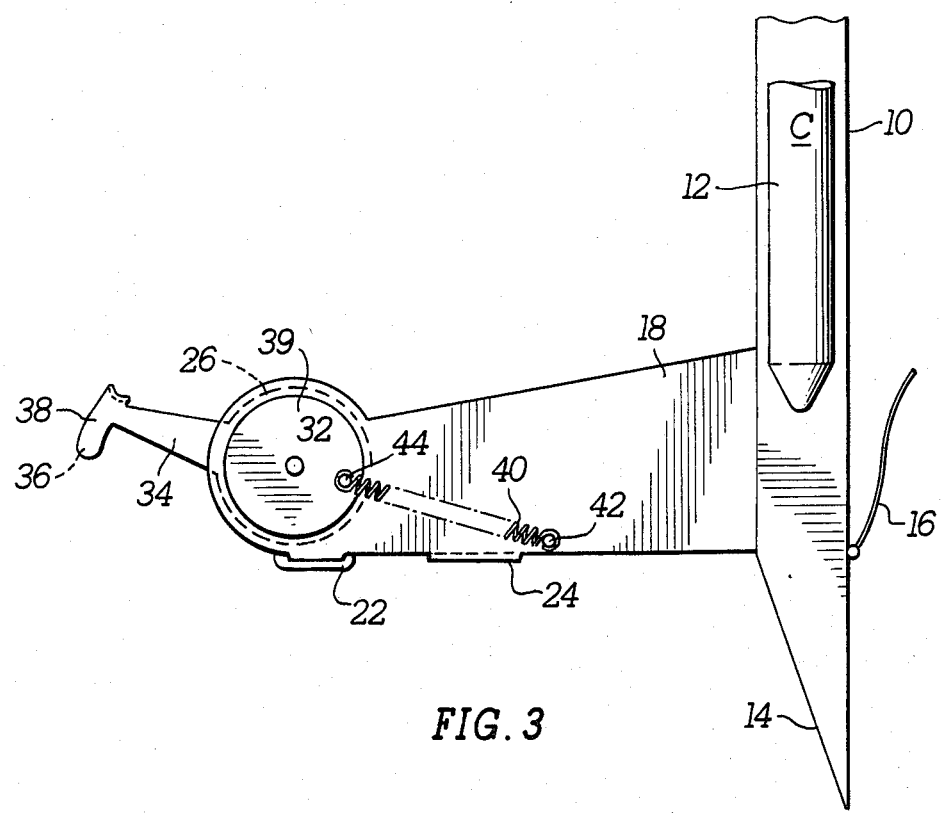
FIG. 3 is a fragmented bottom view of the device in the tripped position.

A mounting bracket 18 is provided toward the forward end of the trolling board and preferrably extends perpendicularly to the body thereof on the side toward which the front 14 is tapered. Bracket 18 is provided with a vertical tab 20 which is preferably provided with a coating 22 of a resilient rubber or plastic material. A second tab 24 may optionally be provided to act as a retaining or stabilizing device for the trip mechanism. The trip mechanism consists of an eccentric rotatable member 26. The point of greatest radius 28 rotatable member 26 serves as a point to engage the line. Preferrably point 28 is also provided with a vertical tab to engage the fishing line 30. In use a fishing line 30 is engaged between tab 20 and tab 28 of rotatable element 26. Element 26 is rotatably attached to bracket 18 by means of a central rivet 32 or equivalent fastener. Formed integrally with element 26 is a trip lever 34. End portions of trip lever 34 are doubled over to form elements 36 and 38 adapted to engage fishing line 30. Integral with rotatable element 26 is a bottom portion 39. Affixed to said bottom portion 39 of the rotatable element is a spring 40 connected at one end to bracket 18 by means of a pin loop or suitable fastening element 42 and at the opposite end to the rotatable element by means of a similar fastening element or pin 44. Pin 44 is positioned on the rotatable element so that when the fishing line is placed in the device as shown in FIG. 2, spring 40 will tend to hold it in such position because it has then been rotated "over center". When the free end of fishing line 30 is pulled, for example by a fish striking the bait, line 30 will pull on lever 34 thereby rotating element 26 clockwise as seen in FIGS. 1 and 2. As pin 44 is rotated to the point where pins 44, 39 and 42 are in alignment, spring 40 will tend to continue the rotation of element 34 to the tripped position shown in FIGS. 3 and 4. This will completely free line 30 from the trolling board. The rear end of body 10 of the trolling may be provided with means 46 having such as a snap fastener or eyelet 48 on the end thereof by means of which line 30 may optionally be continued to be attached to the trolling board even after rotatable fastening element 26 has been tripped. Eyelet 48 is preferably a conventional snap fastener which can be snapped over the line to hold the same on the board.

The trolling board shown on the drawings is designed to travel parallel to the right side of the boat. It will be apparent to those familiar with the art that a trolling board designed to travel on the left of the boat would be a mirror image of that shown in the drawings.

In operation, the line is attached by placing in the slot formed by end tabs 36, 38 of lever 34 and between stationary element 20 and the line engaging surface 28 of rotatable element 26. The device is then rotated clockwise to the desired tension shown in FIG. 2. If the line 30 is not placed through eyelet 48, a strike by a fish will instantly free the board from the line. The board with flag visible is then left bobbing in the water at the location at which the strike occurred. A fin 50 may be attached to the board at the rear thereof to prevent the same from sinking too far into the water when towed. Fin 50, which is attached in such orientation that front is higher than the rear thereof also acts as a stabilizer. Without such a fin the board has a tendency to tip on its side and run flat in the water. Fin 50, however, tends to roll the board upright again by steering the rear outwardly (from the line of travel of the boat) and then rolls it upright.

If the line is passed through eyelet 48 the trolling board is not freed from the line, but retrieval of the fish is assisted because the board will no longer steer the line sideways away from the boat.

While the preferred embodiment has been described, it will readily be apparent to those skilled in the art that modifications may be made without departing from the spirit of the invention.

What is claimed is:

1. A trolling board adapted to be towed on a fishing line behind a boat comprising a flat elongated buoyant body member, weighted and therefore heavier on one side and having an oblique surface adapted to cause said device to move toward one side when towed in water, said trolling board being provided means adapted to engage a fishing line towed behind a boat, said engaging means being provided with a trip mechanism which releases said line when a fish strikes the baited end thereof, said mechanism including a stationary surface and a rotatable member having an eccentric surface which upon rotation will engage said stationary surface so that a line placed between the stationary surface and rotatable member will be squeezed therebetween in a direction such that pulling on the line from the reel urges the same to engage the line more tightly, said rotatable member having a trip lever attached integrally thereto adapted to engage the line at a point nearer the baited end of said line so that a strike on said bait will rotate the locking mechanism in a direction to disengage the line therefrom.

2. A device according to claim 1 wherein a spring is affixed to the perimeter of the rotatable device at a point such that when the line is engaged the spring is rotated over center so that it will tend to rotate the same in the locking direction but after the lever has been tripped said spring will tend to rotate the device in an unlocked direction.

3. A device according to claim 2 wherein a loop is affixed to the rear portion of said trolling board for passage of the line therethrough if desired.

4. A trolling board adapted to be towed on a fishing line behind a boat comprising a flat elongated buoyant body member having one side heavier than the other having the front thereof tapered toward one side and being provided with a releasable line engaging element, said line engaging element being mounted on a bracket attached to the body member generally perpendicular thereto, said bracket having a vertical edge and having rotatably affixed thereto an eccentric rotatable member having an upwardly turned edge adapted to contact the vertical edge on said bracket upon rotation of said rotatable member to an untripped position, said rotatable member having a trip lever attached integrally thereto, said trip lever being provided with a line engaging slot at the end thereof, said rotatable element having a spring affixed thereto at the perimeter thereof at a point so located as to urge the same toward the untripped position when the line is engaged therein and upon partial rotation caused by a fish striking and baited end thereof, said spring will tend to rotate the same toward the tripped position.

* * * * *